United States Patent [19] [11] 4,126,255
Olson [45] Nov. 21, 1978

[54] SKI BOOT CARRIER

[76] Inventor: David V. Olson, 324 IDS Tower, Minneapolis, Minn. 55402

[21] Appl. No.: 802,621

[22] Filed: Jun. 2, 1977

[51] Int. Cl.² .............................................. B65D 71/00
[52] U.S. Cl. ............................ 224/45 S; 280/11.37 R; 280/11.15
[58] Field of Search ............................ 224/45 S, 45 R; 280/11.37 R, 11.37 K, 11.37 A, 9, 8, 11.38, 11.37 E, 12 A, 11.15, 607, 625, 617, 618, 11.12; 211/37

[56] References Cited

U.S. PATENT DOCUMENTS

| 2,883,688 | 4/1959 | Barreca | 224/45 S |
| 3,497,891 | 3/1970 | Voster et al. | 224/45 S |
| 3,675,938 | 7/1972 | Sigl | 280/607 |
| 3,779,568 | 12/1973 | Wakabayashi | 280/11.37 R |
| 3,909,718 | 9/1975 | Allsop et al. | 224/45 S |
| 4,021,054 | 5/1977 | Csutor | 280/11.37 R |
| 4,022,491 | 5/1977 | Powell | 280/607 |

FOREIGN PATENT DOCUMENTS 2,454,942  5/1976  Fed. Rep. of Germany ........... 280/607

Primary Examiner—Trygve M. Blix
Assistant Examiner—Kenneth W. Noland
Attorney, Agent, or Firm—Burd, Braddock & Bartz

[57] ABSTRACT

A ski boot carrier which is also adapted to the carrying of skis. The carrier comprises a base runner adapted for gliding movement over ice or snow on the upper surface of which are mounted two parallel spaced apart support means which in turn carry a pair of parallel spaced apart side-by-side boot clamping plates. A handle is secured to the forward ends of the clamping plates. Preferably the clamping plates are disposed at an angle extending upwardly toward the forward end of the runner. Ski boots are clamped onto the carrier in the usual manner with the toe ends of the boots toward the forward end of the runner. Boots held in this manner may be carried simply by grasping the handle. Skis may be carried by placing them back-to-back between the boots with the toe ends of the skis adjacent the heels of the boots.

7 Claims, 6 Drawing Figures

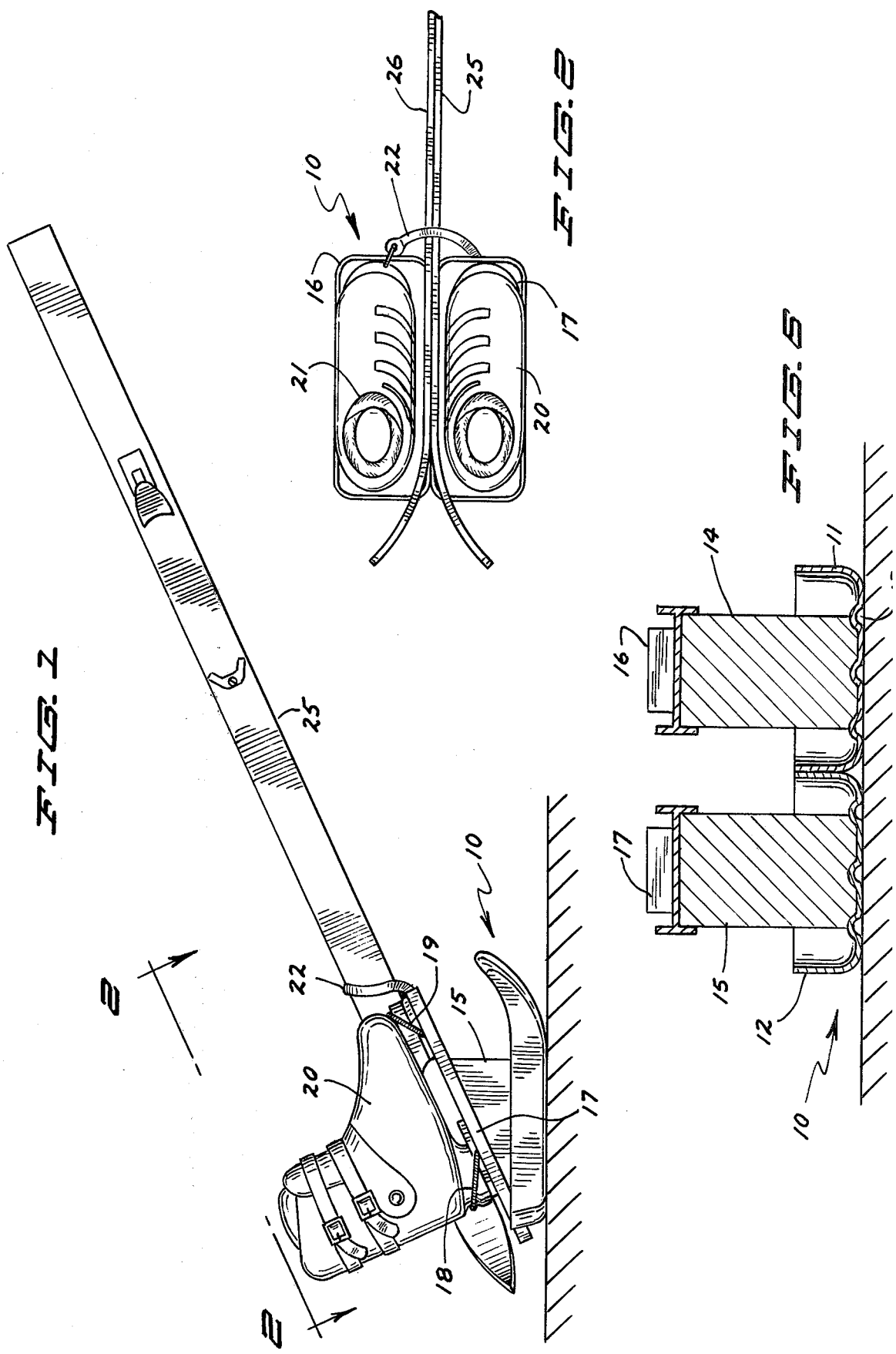

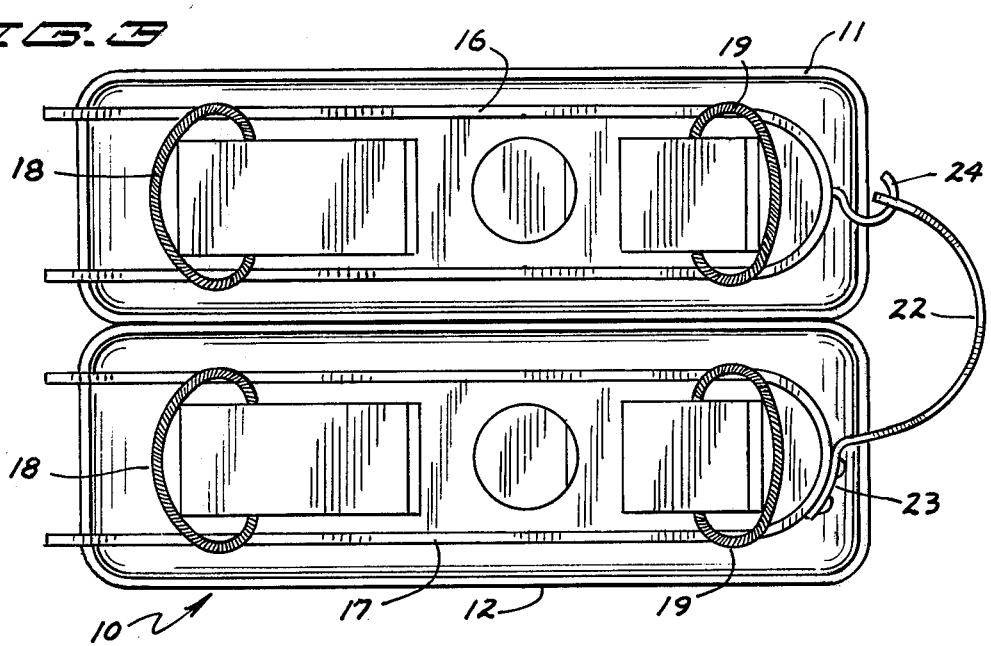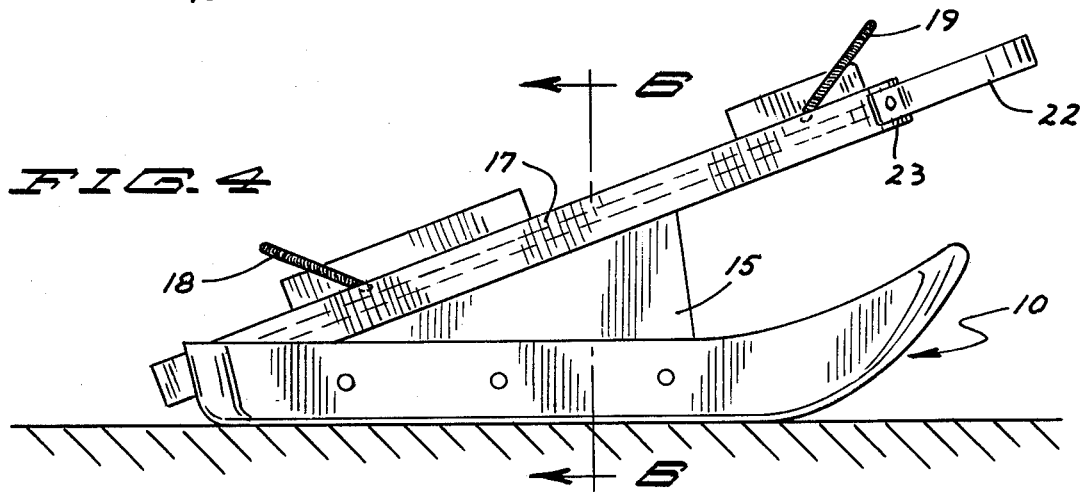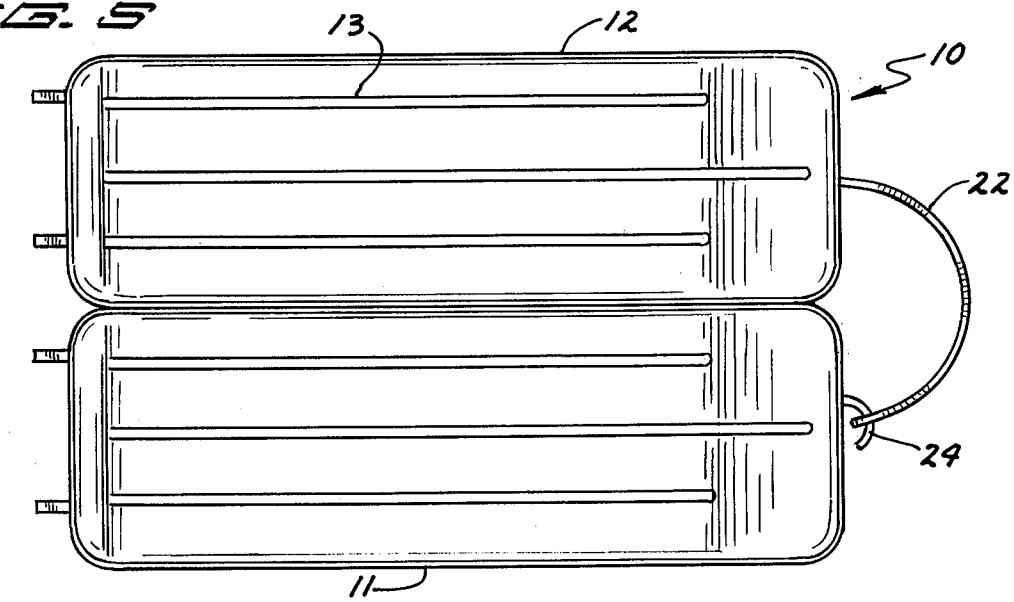

SKI BOOT CARRIER

BACKGROUND OF THE INVENTION

Field of the Invention

This invention is directed to a versatile ski boot carrier which is also adapted to carry skis as well as ski boots.

Skiers are frequently required to carry a quantity of equipment a considerable distance from parking lot to lodge, or the like. Ski boots are bulky, expensive and for maximum life should be maintained with their soles flat in order to preserve their shape. Skis are normally quite long and difficult to carry. The present invention is directed to a carrier for alleviating these problems.

The Prior Art

A large number of ski boot carriers are available. For the most part, they include a frame or panel having a handle at one end and to which a pair of boots may be secured in sole-to-sole relation. Skis for the most part are simply strapped together and carried as a unit, generally along with the ski poles. Binding U.S. Pat. No. 3,412,866 and Penniman U.S. Pat. No. 3,721,373 are representative of the conventional type of boot carrier which is available. Pfleider U.S. Pat. No. 3,272,413 is similar except that the Pfleider carrier includes a rack for also carrying skis. All of these patents are more representative of the problem than of any solution to it. Wilkins U.S. Pat. No. 3,917,137 discloses a combination apparatus for carrying skis, boots and poles in a single unit. However, this device is cumbersome, heavy when loaded, and awkward to maneuver.

Wakabayashi U.S. Pat. No. 3,779,568 shows a carrier for skis only in which the heel ends of the skis are clamped onto a carrier which in one mode rolls on wheels and in another mode functions as a runner for gliding movement over snow.

SUMMARY OF THE INVENTION

The present invention is directed to a ski boot carrier which may additionally function as a ski carrier and comprises a base runner to which is secured a pair of parallel spaced apart support means which in turn carry a pair of parallel spaced apart side-by-side boot clamping plates, each of which is provided with heel and toe clamping means for securing ski boots. A handle extends between the forward ends of the clamping plates for lifting the carrier when used as a boot carrier alone. The same handle is preferably flexible and detachably secured to one of the clamping plates so that it functions as securing means for skis when skis are also carried by placement in back-to-back position between the ski boots on the carrier. The boots are preferably disposed at an angle extending upwardly toward the forward end of the runner with the heels of the boots at the rearward end.

BRIEF DESCRIPTION OF THE DRAWINGS

The invention is illustrated in the accompanying drawings in which:

FIG. 1 is a side elevation of the carrier with both boots and skis secured in place;

FIG. 2 is a top plan view of the carrier on the line 2—2 of FIG. 1;

FIG. 3 is a similar top plan view with boots and skis removed;

FIG. 4 is a side elevation of the carrier without boots or skis;

FIG. 5 is a bottom plan view; and

FIG. 6 is a section on the line 6—6 of FIG. 4.

DESCRIPTION OF THE PREFERRED EMBODIMENT

Referring now to the drawings, the ski boot carrier of the present invention comprises a base runner or sled, indicated generally at 10. Runner 10 preferably has an upwardly turned forward nose to facilitate gliding passage over snow. In the form illustrated, runner 10 is formed from a pair of narrow synthetic resinous plastic shell runner members 11 and 12 secured together in parallel side-by-side relation by means of adhesive, rivets or other equivalent fastening means. The bottom surface of the runner may if desired be provided with grooves 13, as shown, or ribs to facilitate gliding movement of the runner over ice or snow. Although shown as formed from two members, the runner may be a unitary member and may be formed, for example, from wood, metal, etc. Preferably, however, to minimize weight the runner is formed from synthetic resinous plastic material such as fiber glass reinforced plastic formed into appropriate shape.

A pair of support members 14 and 15 is secured to the top surface of the runner in parallel spaced apart relation. In the form illustrated, the support members 14 and 15 are angular blocks or wedges which may be formed from wood or lightweight rigid plastic structural foam, or the like. Alternatively they may be hollow structures or skeletal frames of similar overall configuration. Preferably the top surfaces of the support members 14 and 15 extend upwardly from the rearward to the forward end of the runner, as illustrated. Preferably the angle of inclination is between about 15° to 45° relative to the plane of the runner.

A pair of parallel spaced apart boot clamping plates 16 and 17 is carried by and secured to support members 14 and 15, respectively. Each clamping plate has heel engaging means 18 and toe engaging means 19 disposed at opposite ends for securing and clamping the boot to the plate. The boot clamping means may be in the form of wire bails or cables as currently in use. As best shown in FIG. 1, the heel and toe, respectively, of a ski boot 20 are engaged by the clamping members 18 and 19 such that the boot is securely attached to the plate with the boot sole maintained flat. To minimize weight, the clamping plate is desirably formed from strong rigid lightweight synthetic resinous plastic material.

To facilitate lifting and carrying of the apparatus when holding boots alone, a handle 22 is provided. Handle 22 extends between the toe ends of clamping plates 16 and 17. The handle 22 is preferably in the form of a flexible strap or cable fixedly attached at one end to one of the clamping plates, as at 23, and detachably secured to the other, as by hook means 24, or snap means or equivalent detachable fastening means. As shown in FIGS. 1 and 2, when a pair of skis 25, 26 is positioned in the carrier, handle 22 functions as a retaining member for the skis.

When the carrier device is used simply as a boot carrier, the boots are clamped in place on the clamping plates and the unit is lifted and carried by means of handle 22. When so used, the boots may be carried in one hand and the skis and ski poles strapped together may be carried in the usual manner on the opposite shoulder. When the boot carrier is also used as a ski carrier, then the skis are strapped together in sole-to-sole relation and inserted adjacent their toe ends between the boots. As seen in FIG. 2, when a pulling force is exerted on the skis, the outwardly turned toes of the skis keep the skis in place. When the boots are arrayed at a convenient angle, for example about 30°, then the heel ends of the skis are conveniently positioned to serve as a handle for pulling the assembly on the runner for gliding passage over ice or snow, or the like. Although somewhat more cumbersome, the entire assembly may be carried with the skis resting on one's shoulder in the conventional manner. For carrying the equipment through doors and the like, the entire assembly may be carried vertically either by grasping handle 22 or by grasping the midsection of the skis.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A ski boot carrier comprising:
   (A) a short longitudinally extending base runner adapted for gliding movement over ice or snow, said runner approximating the length of a ski boot and the width of a pair of ski boots,
   (B) a pair of parallel spaced apart support means carried by said runner extending longitudinally and secured thereto,
   (C) a pair of parallel spaced apart side-by-side longitudinally extending boot clamping plates each carried by one of said support means and secured thereto,
   (D) clamping means on said plates for securing ski boots thereto, and
   (E) handle means secured to the forward ends of said clamping plates,
   said boots when clamped to said clamping plates being spaced apart and adapted to receive the toe ends of a pair of skis in sole-to-sole relation.

2. A ski boot carrier according to claim 1 wherein said clamping plates are disposed at an angle extending upwardly toward the forward end of the runner.

3. A ski boot carrier according to claim 2 wherein said clamping plates are disposed at an angle between about 15° and 45° relative to the base runner.

4. A ski boot carrier according to claim 2 wherein each of said support means is a wedge secured to the runner and to one of said clamping plates.

5. A ski boot carrier according to claim 4 wherein heel-engaging clamping means are provided adjacent the lower rearward end of each clamping plate and toe-engaging clamping means are provided adjacent the higher forward end of each clamping plate.

6. A ski boot carrier according to claim 1 wherein said handle means is flexible.

7. A ski boot carrier according to claim 6 wherein said flexible handle is fixedly secured to one of said clamping plates and detachably secured to the other.

* * * * *